United States Patent
MacDonald

[15] 3,664,986
[45] May 23, 1972

[54] 1,2,5-THIADIAZOLE POLYMERS

[72] Inventor: Robert Neal MacDonald, Wilmington, Del.

[73] Assignee: E. I. du Pont de Nemours and Company, Wilmington, Del.

[22] Filed: Oct. 14, 1969

[21] Appl. No.: 866,401

[52] U.S. Cl. .....................260/78 R, 117/128.4, 117/161 P, 260/30.2, 260/30.6 R, 260/30.8 R, 260/32.6 N, 260/33.4 R, 260/33.8 R, 260/47 CZ, 260/47 C, 260/47 ET, 260/75 H, 260/75 N, 260/75 S, 260/77.5 MA, 260/77.5 AQ, 260/78 S, 260/78 TF
[51] Int. Cl. ..........................................C08g 20/20
[58] Field of Search ........................260/78, 302 D

[56] References Cited

UNITED STATES PATENTS

| | | | |
|---|---|---|---|
| 3,376,268 | 4/1968 | Preston | 260/78 R |
| 3,476,719 | 11/1969 | Frazer et al. | 260/78 R |
| 3,484,407 | 12/1969 | Preston | 260/78 R |

Primary Examiner—Harold D. Anderson
Attorney—Anthony P. Mentis

[57] ABSTRACT

Described and claimed are polymers containing 1,2,5-thiadiazole rings in the polymer chain and their preparations. The polymers are capable of being made into films, fibers, coatings and molded objects.

8 Claims, No Drawings

1,2,5-THIADIAZOLE POLYMERS

BACKGROUND OF THE INVENTION

1. Field of the Invention

This invention is concerned with polymers containing 1,2,5-thiadiazole rings in the polymer chain and the preparation of such polymers by condensation polymerization procedures.

2. Description of Prior Art

Polymers containing 1,2,5-thiadiazole rings in the polymer chain are unknown, even though certain of the intermediates that could be used to make them are known compounds, e.g., 1,2,5-thiadiazole-3,4-dicarboxylic acid, the corresponding dicarbonyl chloride and dinitrile, and 3-hydroxy-1,2,5-thiadiazole-4-carboxylic acid [U.S. Pat. Nos. 2,990,409; 3,068,238; 3,117,972; Pesin et al., Zhurnal Obshchei Khimie, 32, 3505 (1962)].

DESCRIPTION OF THE INVENTION

The invention is defined broadly as a polymer containing 1,2,5-thiadiazole rings in the polymer chain. Such a polymer chain can be described as containing recurring divalent 1,2,5-thiadiazole-3,4-diyl groups, represented by the formula

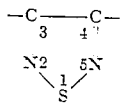

Preferred embodiments are polyesters, polyamides, polyhydrazides, polyoxadiazoles, polyethers and poly(amide-urethanes). These preferred polymers can be represented by the general formula

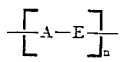

in which A represents the divalent 1,2,5-thiadiazole-3,4-diyl group, $n$ is the number of recurring units in the polymer chain and E is at least one divalent radical selected from the group:

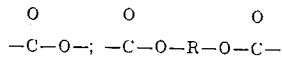

in which R is alkylene of two to 20 carbons,
phenylene of the formula

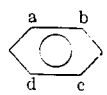

wherein $a$, $b$, $c$, and $d$ are hydrogen, alkyl, aryl, alkoxy, halogen, nitro or nitrile and wherein the two remaining bonds each attached to an oxygen in the polymer chain are ortho, meta or para to each other,
cyclohexylene of the formula

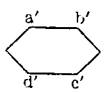

wherein the ring is saturated and the substituents $a'$, $b'$, $c'$ and $d'$ are hydrogen, alkyl, cycloalkyl, alkoxy or halogen, and the two remaining bonds each attached to an oxygen in the polymer chain are ortho, meta or para to each other,
aromatic group of the formula

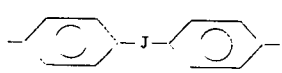

wherein J is oxygen, sulfur, alkylene of one to 12 carbons, alkylidene, including polyhaloalkylidene, of two to 13 carbons, and phenylene, and the rings may be substituted with halogen,
group corresponding to the above aromatic group wherein one or both of the depicted aromatic rings is fully hydrogenated;

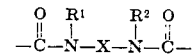

wherein $R^1$ and $R^2$ are hydrogen or lower alkyl and X is:
polymethylene of the formula $-(CH_2)_n-$ where $n$ is an integer of 0–20, with the proviso that $R^1$ and $R^2$ may also be aryl when X is polymethylene,
phenylene of the formula

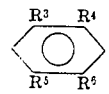

wherein $R^3$, $R^4$, $R^5$ and $R^6$ are hydrogen, alkyl, aryl, alkoxy, halogen, nitro or nitrile and the two remaining bonds each attached to a nitrogen in the polymer chain are ortho, meta or para to each other, with the proviso that $R^1$ and $R^2$ are hydrogen only when X is phenylene,
cyclohexylene of the formula

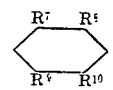

wherein the ring is saturated, the R's are hydrogen, alkyl, cycloalkyl, alkoxy or halogen and the two remaining bonds each attached to a nitrogen in the polymer chain are ortho, meta or para to each other,
aromatic group of the formula

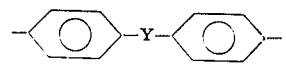

wherein Y is oxygen, sulfur, alkylene of one to 12 carbons, alkylidene, including polyhaloalkylidene, of two to 13 carbons, and phenylene, and the rings may be substituted with halogen, and
group corresponding to the above aromatic group wherein one or both of the depicted aromatic rings is fully hydrogenated;

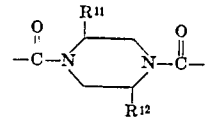

wherein $R^{11}$ and $R^{12}$ are hydrogen or lower alkyl;

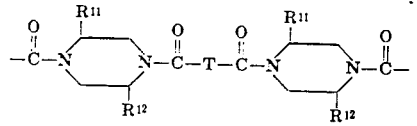

wherein T is o, m, or p phenylene and $R^{11}$ and $R^{12}$ are as defined above;

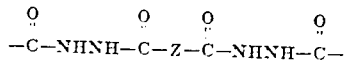

wherein Z is arylene of 6 carbon atoms or $(CH_2)_n$ where $n$ is an integer of 1 to 20;

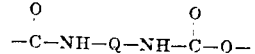

wherein Q is arylene or alkylarylene of up to 12 carbon atoms;

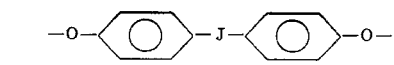

wherein J is as previously defined above;

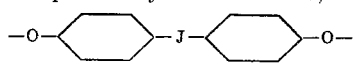

wherein J is as previously defined above and one or both of the depicted rings is fully hydrogenated; and

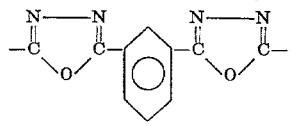

The polymers of the invention are thermoplastic solids which are readily fabricated into thin coatings and molded objects, and may be made as films or strong fibers by conventional solution spinning, solvent casting and/or melt spinning techniques. The films can be used for packaging purposes and the fibers can be employed in woven or non-woven fabrics. The polymers are thermally stable, range from relatively low to relatively high in melting point, when higher melting have high glass transition temperatures, and are flame-resistant, i.e., they are self-extinguishing after direct exposure to a flame. They are insoluble in water, lower aliphatic alcohols, lower aliphatic ketones and aliphatic hydrocarbons, but are variously soluble in phenols, e.g., m-cresol, dimethylformamide, dimethylacetamide, hexamethylphosphoramide, N-methylpyrrolidone, 2,4-dimethylsulfolane and polyhalogenated solvents such as chloroform and hexafluoroisopropanol, and concentrated sulfuric acid.

The polymers are prepared by condensation polymerization from suitable 3,4-difunctionally-substituted 1,2,5-thiadiazoles and difunctional coreactants such as glycols, diamines and diisocyanates. Mixed polymers may be prepared using three or more direactive components as desired.

The known disubstituted 1,2,5-thiadiazoles that can be used directly in forming polymers or indirectly through conversion to suitable intermediate derivatives are the 3,4-dicarboxylic acid, the 3,4-dicarbonyl chloride, the dimethyl 3,4-dicarboxylate, the 3,4-dicarbonitrile, the 3,4-dichloro derivative and the 3-hydroxy-4-carboxylic acid.

SPECIFIC EMBODIMENTS OF THE INVENTION

More detailed information on reaction conditions and alternatives is given in the following examples which are illustrative and not limitative.

EXAMPLE 1

Preparation of a 1,2,5-thiadiazole polyester from a hydroxy acid via the acid chloride in situ

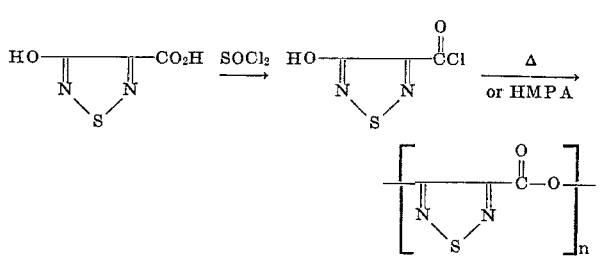

HMPA = hexamethylphosphoramide

A. A mixture of 17.6 g. of 3-hydroxy-1,2,5-thiadiazole-4-carboxylic acid and 260 ml. of thionyl chloride was refluxed under anhydrous conditions for 3.5 hours. The resulting solution was first heated under distilling conditions at atmospheric pressure to remove most of the thionyl chloride and then at 98°C./0.05 mm. for 2 hours to remove all volatile constituents. A pale green transparent glassy product remained. This was triturated with anhydrous ether to leave 8.2 g. of polymer as a white powder exhibiting a melting point of 283°C. and an inherent viscosity of 0.65 in dimethylacetamide at 25°C.

Infrared spectra of this polyester show carbonyl, ester —C—O—C—, and conjugated unsaturation absorption corresponding to the polyester structure

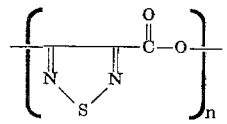

B. In a similar experiment 5 g. of 3-hydroxy-1,2,5-thiadiazole-4-carboxylic acid, 75 ml. of thionyl chloride, and 1.5 ml. of hexamethylphosphoramide were stirred together under nitrogen for 1.5 hours at ambient temperature, then refluxed for 3 hours. The system was filtered with a sintered glass Buchner funnel, and the white precipitate was washed on the filter with pentane and vacuum oven-dried at 50°C. to give 2.1 g. of 1,2,5-thiadiazole polyester. The polymer exhibited a glass transition temperature of 155° C., a melting point of 287°C., and an inherent viscosity of 0.3 in hexamethylphosphoramide at 25°C.

Anal. Calcd. for $C_3O_2N_2S$:

|  | C, 28.12; | H, 0; N, 21.88; S, 25.00 |
|---|---|---|
| Found: | C, 28.01; | H, 0; N, 21.62; S, 24.91. |

The polymerization procedures of this example demonstrate methods for removing HCl by heat (part A) and by an acid acceptor (part B). The procedures may be modified by using inert solvent media such as ether, chloroform, dioxane and tetrahydrofuran, or by using other HCl acceptors such as dimethylformamide, dimethylacetamide, pyridine, quinoline and calcium hydroxide. The method of part B can also be modified by withholding the HCl acceptor until after excess thionyl chloride has been removed, as in the first stage of part A.

EXAMPLE 2

Preparation of 1,2,5-thiadiazole polyester from a hydroxy acid via the isolated acid chloride

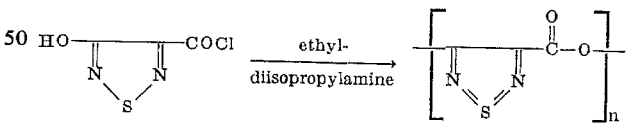

During the thermal polymerization at 98°C./0.05 mm. in example 1, there was obtained 0.9 g. of white sublimate in the still head. This product was identified to be 3-hydroxy-1,2,5-thiadiazole-4-carbonyl chloride, melting at 105°–118°C. (resublimed m. p. 107.5°–108°C.).

Anal. Calcd. for $C_3HO_2NSCl$:

|  | C, 21.88; H, | 0.64; N, 17.03; Cl, 21.58 |
|---|---|---|
| Found: | C, 22.49; H, | 0.76; N, 15.90; Cl, 21.40. |

Infrared absorption shows OH, acid chloride carbonyl, and $C=N$.

A mixture of 0.1 g. (0.0006 mole) of the above 3-hydroxy-1,2,5-thiadiazole-4-carbonyl chloride and 2.5 ml. of 2,4-dimethylsulfolane was stirred at room temperature under nitrogen to dissolve the acid chloride, and 0.1 ml. (0.0006 mole) of ethyl diisopropylamine was then added. After 27 hours' stirring a white precipitate which had formed was filtered, washed with water and acetone, and dried at 50°C./1 mm. overnight to give 0.01 g. of white 1,2,5-thiadiazole-3,4-polyester of inherent viscosity 1.08 in dimethylacetamide at 25°C.

The procedure of this example can be modified by changing the temperature, which suitably can be in the range −78° to 200°C. The time of polymerization varies from a few minutes to over a day according to the temperature, shorter times being sufficient at higher temperature. Solvents are desirable and many are suitable, e.g., chloroform, other halogenated hydrocarbons, dimethylformamide, dimethylacetamide, sulfolane, hexamethylphosphoramide and N-methylpyrrolidone. Other acid acceptors as described in example 1 may be used.

EXAMPLE 3

Preparation of a 1,2,5-thiadiazole polyester from a glycol and a dicarboxylic ester

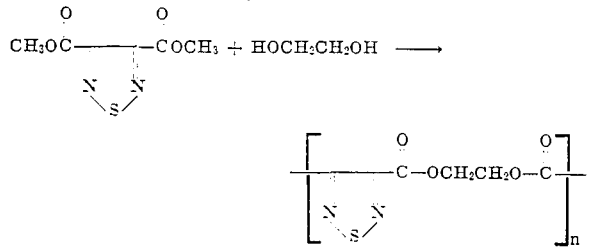

In a 35 mm. × 8 inch polymer tube were placed 8 g. (0.04 mole) of dimethyl 1,2,5-thiadiazole-3,4-dicarboxylate, 5.5 ml. (0.088 mole) of ethylene glycol (freshly distilled from calcium hydride) and 0.013 g. of tetraisopropyl titanate. The mixture was heated under nitrogen 3.5 hours at 180°C. to distill off the methanol and form the glycol ester. With the temperature maintained at 180°C., the pressure was gradually reduced to 1.1 mm. over an additional period of 40 minutes, after which the contents of the tube was a brown viscous mass. Heating under vacuum was continued for an additional 40 minutes. The vacuum was released by slowly introducing nitrogen, and the tube was then allowed to cool. The tube was then broken to allow removal of the dark, hard plug of polymer. This was dissolved in 30 ml. of hexafluoroisopropanol, and the dark viscous solution was pressure filtered then stirred into 300 ml. of water. A very light tan precipitate was formed. The solid was isolated on a filter, washed well with water and acetone, and dried in a vacuum oven at 80°C./5 mm. overnight to give 4.9 g. of poly(ethylene 1,2,5-thiadiazole-3,4-dicarboxylate) melting at 193°C. and exhibiting an inherent viscosity of 0.2 in hexafluoroisopropanol at 25°C.

Anal. Calcd. for $C_6H_4O_4N_2S$:
C, 36.00; H, 2.00; N, 14.00; S, 16.00
Found: C, 36.53; H, 2.45; N, 13.99; S, 16.04.

Infrared spectra of this polymer show saturated C—H, carbonyl, ester —C—O—C—, and conjugated unsaturation absorption corresponding to the polyester structure shown above.

The polyester formation described in this example may be varied by starting with other esters, such as the diphenyl ester of 1,2,5-thiadiazole-3,4-dicarboxylic acid. The procedure is also applicable to other diols, e.g., polymethylene glycols of the formula $HO(CH_2)_nOH$ where $n$ is an integer of 2–20; phenylene diols of the formula

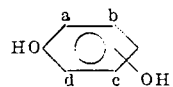

wherein the substituents $a$, $b$, $c$ and $d$ may be variously hydrogen, alkyl, aryl, alkoxy (preferably methoxy), halogen, nitro or nitrile, and the hydroxyl groups may be positioned ortho, meta or para to each other; cyclohexylene diols corresponding to the formula

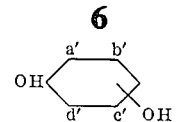

wherein the ring is saturated and the substituents $a'$, $b'$, $c'$ and $d'$ may be hydrogen, alkyl, cycloalkyl, alkoxy or halogen and the hydroxyl groups may be positioned ortho, meta or para to each other; aromatic diols of the formula

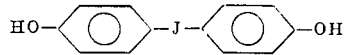

wherein J may be oxygen, sulfur, alkylene of one to 12 carbons, alkylidene, including polyhaloalkylidene, of two to 13 carbons, and phenylene, and the rings may be substituted (especially with halogen); and diols corresponding to the above aromatic diols wherein one or both of the depicted aromatic rings may be fully hydrogenated.

EXAMPLE 4

Preparation of a polyester from an aromatic diol and 1,2,5-thiadiazole-3,4-dicarbonyl chloride

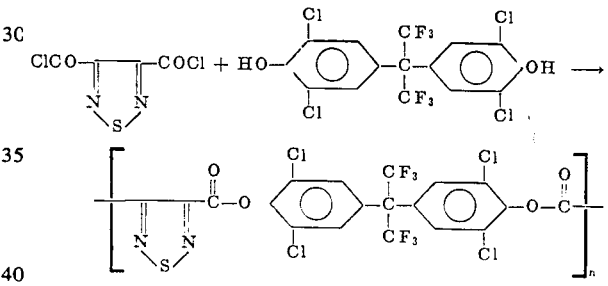

A solution of 5.275 g. (0.025 mole) of 1,2,5-thiadiazole-3,4-dicarbonyl chloride in 25 ml. of alcohol-free, anhydrous chloroform was added rapidly to a system composed of 11.850 g. (0.025 mole) of 1,1,1,3,3,3hexafluoro-2-bis(3,5-dichloro-4-hydroxyphenyl)propane, 10 ml. (0.050 mole) of 5N aqueous sodium hydroxide solution, 100 ml. of water, 0.5 g. of sodium lauryl sulfate (Duponol ME) and 25 ml. of alcohol-free chloroform being stirred rapidly in an ice-water-cooled, jacketed blender. Rapid stirring was continued for 5 minutes. The initial temperature was 6.5°C. and the final temperature 28°C. The system was poured into a large beaker and heated on a steam bath to remove chloroform and coagulate the polymer. The coagulum was washed with water four times in a blender and dried at 80°C./5 mm. overnight to give 12.2 g. of polyester exhibiting a glass transition temperature of 165°C., a melting point of 197°–213°C., and an inherent viscosity of 0.12 in m-cresol at 25°C.

Anal. Calcd. for $C_{19}H_4Cl_4F_6O_4N_2S$: S, 5.23
Found: S, 5.06.

Infrared spectra of the polymer show carbonyl, ester —C—O—C—, unsaturated C—H and conjugated cyclic —C=C and —C=N, corresponding to the polyester structure shown above.

The interfacial condensation process of this example can be varied with respect to the solvent employed, the reaction temperature, the emulsifying agent and the acid acceptor. The organic solvent can be a halocarbon (methylene chloride, carbon tetrachloride, dichloroethane, tetrachloroethane, etc.), an aliphatic or aromatic hydrocarbon (hexane, cyclohexane, toluene, etc.), an ether (diethyl ether, dioxane, tetrahydrofuran, etc.) or other inert solvent. The temperature can be in the range −80°C. to +100°C., but is preferably about 0–10°C. The emulsifying agent can be any of the well-known ionic or nonionic surface-active agents, such as the alkali metal sulfates of aliphatic alcohols containing from 8–18 carbon atoms, the higher fatty alcohols themselves, higher fatty alcohol esters, alkylaryl sulfonates, sodium petroleum sulfonate, higher fatty quaternary ammonium salts, higher polyether alcohols, etc. The acid acceptor can be an alkali carbonate (sodium or potassium carbonate) or an organic base (piperazine, dimethylpiperazine, pyridine, other tertiary amines, etc.).

Any of the aromatic diols mentioned in reference to example 3 can be used in the process of example 4.

EXAMPLE 5

Preparation of a 1,2,5-thiadiazole/straight-chain aliphatic polyamide by interfacial condensation

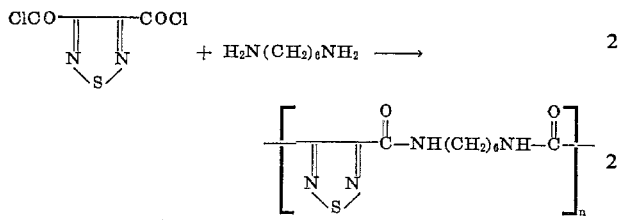

A solution of 10.550 g. (0.050 mole) of 1,2,5-thiadiazole-3,4-dicarbonyl chloride in 25 ml. of anhydrous, alcohol-free chloroform was added rapidly to an ice-water-cooled, jacketed blender containing 6.620 g. (0.0570 mole) of hexamethylenediamine, 140 ml. of water, 1 g. of sodium lauryl sulfate (Duponol ME), 20 ml. (0.100 mole) of aqueous 5 N sodium hydroxide and 25 ml. of alcohol-free chloroform as the system was cooled and stirred rapidly at 9°C. Stirring was discontinued after 5 minutes, the thin emulsion was heated to remove the chloroform, and the polymer was washed with water and dried at 50°C./5 mm. to give 9.35 g. of a thiadiazole polyamide. When heated in contact with a metal block the polymer became adherent at 80°C. and gave a smooth hard coating on the block after being heated to 125°C. and then cooled. It exhibited an inherent viscosity of 0.42 in m-cresol at 25° C.

Anal. Calcd. for $C_{10}H_{14}O_2N_4S$:
|  | C, 47.25; | H, 5.51; | N, 22.04; | S, 12.59 |
|---|---|---|---|---|
| Found: | C, 47.52; | H, 6.18; | N, 20.25; | S, 12.38. |
|  | 47.16 | 5.72 | 19.92 |  |
|  | 47.45 | 5.81 | 21.21 |  |

Infrared spectra of the polymer show NH, carbonyl, and saturated C—H corresponding to the polyamide structure shown above.

During the drying process at 50°C. this low-melting polymer foamed to give on cooling a rigid foam in the shape of a ball the diameter of the evaporating dish.

The interfacial condensation procedure of this example can be varied like that of example 4 with respect to alternatives of solvent, reaction temperature, emulsifying agent and acid acceptor.

The polyamide formation described in this example is applicable to a variety of diamines. These include: polymethylene diamines of the formula $R^1NH(CH_2)_nNHR^2$ wherein $R^1$ and $R^2$ may be variously hydrogen, alkyl or aryl, and n is an integer of 0–20; phenylene diamines of the formula

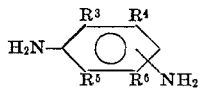

wherein the R's may be variously hydrogen, alkyl, aryl, alkoxy (preferably methoxy), halogen, nitro or nitrile, and the amino groups may be positioned ortho, meta or para to each other; cyclohexylene diamines corresponding to the above phenylene diamines wherein the ring is saturated, the R's may be variously hydrogen, alkyl, cycloalkyl, alkoxy or halogen, and either or each amino group may also bear a single lower alkyl substituent; aromatic diamines of the formula

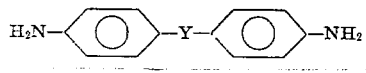

wherein Y may be oxygen, sulfur, alkylene of one to 12 carbons, alkylidene, including polyhaloalkylidene, of two to 13 carbons, and phenylene, the rings may be substituted (especially with halogen), and either or each amino group may also bear a single lower alkyl substituent; and diamines corresponding to the above aromatic diamines wherein one or both of the depicted aromatic rings may be fully hydrogenated. The properties of the novel polymers that contain substituted phenylene rings will be substantially the same the the properties of the polymers that contain unsubstituted phenylene rings.

EXAMPLE 6

Preparation of a 1,2,5-thiadiazole/-N-alkyl polyamide

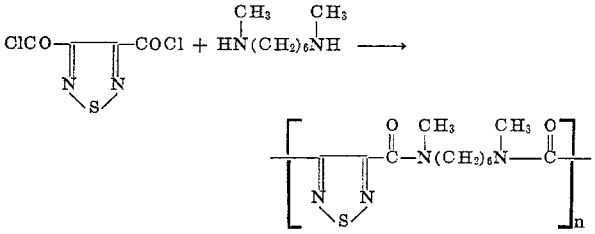

In the manner of example 5, a solution of 10.550 g. (0.050 mole) of 1,2,5-thiadiazole-3,4-dicarbonyl chloride in 35 ml. of anhydrous, alcohol-free chloroform was added rapidly to an ice-water-cooled, jacketed blender containing 8.240 g. (0.0570 mole) of N,N'-dimethylhexamethylenediamine, 180 ml. of water, 20 ml. (0.100 mole) of aqueous 5N sodium hydroxide, 1 g. of sodium lauryl sulfate (Duponol ME), and 25 ml. of alcohol-free chloroform as the system was stirred rapidly at 12°C. Stirring was continued for 5 minutes, and the thin emulsion was heated to remove chloroform, washed and dried at 50°C./5 mm. to give 9.7 g. of 1,2,5-thiadiazole polyamide. The polymer softened on a metal block at 74°C. and gave a tough protective coating on the metal when heated to 125°C. and cooled. It exhibited an inherent viscosity of 0.64 in m-cresol at 25°C.

Anal. Calcd. for $C_{12}H_{18}O_2N_4S$:
|  | C, 51.07; | H, 6.38; | N, 19.85; | S, 11.35 |
|---|---|---|---|---|
| Found: | C, 51.30; | H, 6.42; | N, 19.81; | S, 11.20 |

Infrared spectra of this polymer show amide carbonyl and saturated C—H corresponding to the polyamide structure above.

EXAMPLE 7

Preparation of 1,2,5-thiadiazole/-cycloaliphatic polyamide

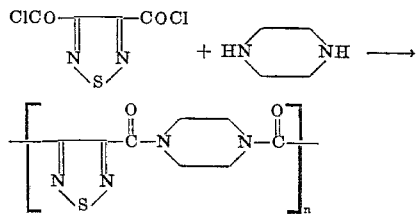

A solution of 13.82 g. (0.0655 mole) of 1,2,5-thiadiazole-3,4-dicarbonyl chloride in 35 ml. of anhydrous, alcohol-free chloroform was added rapidly to an ice-cooled, jacketed blender containing 6.62 g. (0.077 mole) of piperazine, 187 ml. of water, 1.35 g. of sodium lauryl sulfate (Duponol ME), 26.2 ml. (0.131 moles) of aqueous 5N sodium hydroxide, and 35 ml. of alcohol-free chloroform as the system was stirred rapidly at 11°C. After 5 minutes of stirring the thick white emulsion was treated with water and then heated on a steam bath to remove the chloroform and coagulate the polymer. The coagulum was washed in a blender many times with water until the wash water was clear, washed once with acetone, and was then dried at 80°C./1 mm. for 2 days to give 11 g. of white granular polyamide. The polymer exhibited an inherent viscosity of 2.01 in m-cresol at 25°C., a metal block stick temperature of 360°C., and a glass transition temperature of 212°-214°C. (The corresponding phthaloyl/piperazine polyamide has a glass transition temperature of 191°-194.5°C.)

Anal. Calcd. for $C_8H_8O_2N_4S$:
C, 42.85; H, 3.57; N, 25.00; S, 14.28
Found: C, 42.79; H, 3.97; N, 24.03; S, 14.09
                                23.87

Infrared spectra show amide carbonyl, saturated C—H, and conjugated cyclic C = N, corresponding to the 1,2,5-thiadiazole polyamide structure as indicated in the equation above.

A clear, tough film of the thiadiazole/piperazine polyamide was cast from hexafluoroisopropanol and drawn 2× at 180°–200°C. The film exhibited a tensile/elongation/modulus of 4,480 psi/8.7%/107,000 psi. This film did not continue to burn when ignited in air, whereas a film of the corresponding phthaloyl/piperazine polyamide supported combustion in air and was completely consumed. Films made of the polymers of this example are useful for packaging purposes.

EXAMPLE 8

A 1,2,5-thiadiazole/cycloaliphatic polyamide

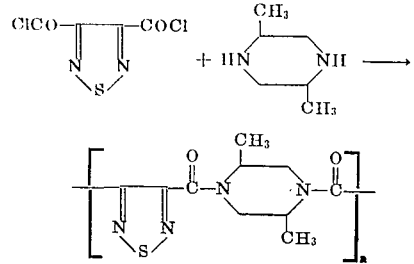

A. A solution of 7.72 g. (0.0366 mole) of 1,2,5-thiadiazole-3,4-dicarbonyl chloride in 25 ml. of anhydrous alcohol-free chloroform was added rapidly to an ice-cooled, jacketed blender containing 4.875 g. (0.043 mole) of trans-2,5-dimethylpiperazine, 130 ml. of water, 0.75 g. of sodium lauryl sulfate (Duponol ME), 14.64 ml. (0.0732 mole) of aqueous 5N sodium hydroxide and 20 ml. of alcohol-free chloroform. After 5 minutes of rapid stirring the polymer was isolated as in example 7 with four water washes and one acetone wash to give 6.0 g. of granular polyamide exhibiting an inherent viscosity of 3.18 in m-cresol at 25°C., an osmotic molecular weight $M_n = 42,100$ in chloroform at 25°C., a stick temperature on a metal block of 305°C., and a glass transition temperature of 233°C. (The corresponding trans-2,5-dimethylpiperazine/phthaloyl polyamide exhibited a glass transition temperature of 190°C.).

Anal. Calcd. for $C_{10}H_{12}O_2N_4S$:
C, 47.64; H, 4.77; N, 22.22; S, 12.68.
Found: C, 47.27; H, 4.88; N, 21.88; S, 12.19.
       47.00      4.82      21.86

Infrared spectra show amide carbonyl, saturated C—H, and conjugated cyclic C = N corresponding to the 1,2,5-thiadiazole polyamide above.

A tough, transparent film of the thiadiazole polyamide cast from chloroform was drawn 2.5× at 230°C. The film exhibited a tensile/elongation/modulus of 17,700 psi/8.2%/268,200 psi. At room temperature an undrawn film showed a dielectric constant of 4.2, a dielectric strength of 3.3 Kv/mil, and a dissipation factor of 0.008.

B. The polyamide of this example was also prepared by adding 0.642 g. (0.00304 mole) of 1,2,5-thiadiazole-3,4-dicarbonyl chloride in 15 ml. of anhydrous, alcohol-free chloroform to 0.347 g. (0.00304 mole) of trans-2,5-dimethylpiperazine and 0.842 ml. (0.00608 mole) of triethylamine in 15 ml. of purified chloroform. The mixture was stirred for 8 minutes and was then allowed to stand 6 days during which a total of 3.6 ml. of triethylamine was added at three intervals. The polymer was precipitated with hexane and was then washed once in a blender with acetone, 4 times with water, and again with acetone. The washed polymer was vacuum-oven dried overnight at 80°C. to give 0.54 g. of snow white granular product. The polymer exhibited a stick temperature of 300°C. on a metal block, and gave a viscous melt at 340°C. from which filaments could be drawn. It exhibited an inherent viscosity of 0.58 in m-cresol at 25°C.

C. A solution of 21.10 g. (0.100 mole) of 1,2,5-thiadiazole-3,4-dicarbonyl chloride and 1.4 ml. (0.012 mole) of benzoyl chloride in 70 ml. of alcohol-free, anhydrous chloroform was added rapidly to an ice-cooled, jacketed blender containing 12.92 g. (0.113 mole) of trans-2,5-dimethylpiperazine, 340 ml. of water, 8.00 g. (0.200 mole) of sodium hydroxide and 60 ml. of alcohol-free, anhydrous chloroform. After 5 minutes of rapid stirring, the polymer was isolated as in paragraph A of this example. There was obtained 17 g. of colorless, granular polyamide exhibiting an inherent viscosity of 1.63 in m-cresol at 25°C.

A 12 percent by weight solution of this polymer in chloroform was dry spun into colorless fibers, which upon being drawn 2.5× over a pin at 185°C. and set in 40–60 lb. steam in an autoclave for 15 minutes exhibited a tensile strength of 1.83 g./denier, and elongation of 30 percent, and an initial modulus of 30.7 g./denier. At 3 percent elongation its work recovery was 95 percent and its tensile recovery was 98 percent. The fibers are suitable for weaving into a fabric useful for apparel. A membrane made of the polymer of this example was fitted into a cell into which salt water was pressured. Flow through the membrane was 12 gal./sq. ft./day and 78 percent of the salt in the original water was rejected, thus showing the utility of the polymer in water desalination.

Another utility is for coating wires. A solution of 40 grams of a polymer made according to example 8-C was dissolved in 180 ml. of tetrachloroethane. A length of no. 14 copper wire was then drawn through the solution under a stationary bar held near the bottom of the solution and then hung vertically to allow solvent to evaporate. The wire was then dipped again similarly for two more times and dried in an oven at 100°C. overnight. The clear, flexible tough coating on the wire served as an excellent insulation. A volt meter showed no current leakage through the insulating film at a potential of 110 volts.

EXAMPLE 9

Preparation of a 1,2,5-thiadiazole/-m-phenylene polyamide

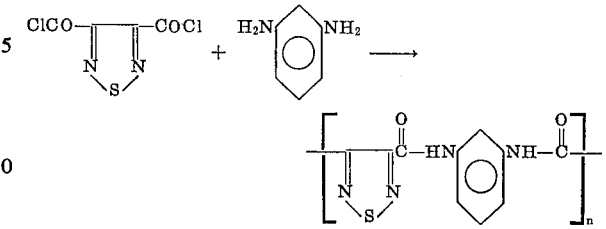

A solution of 1.277 g. (0.0118 mole) of m-phenylenediamine in 40 ml. of anhydrous hexamethylphosphoramide was stirred in an ice bath for 15 minutes, at which point 2.493 g. (0.0118 mole) of 1,2,5-thiadiazole-3,4-dicarbonyl chloride solid was added. Stirring was continued at ice temperature for 2 hours, then at ambient temperature for 3 days. The now-cloudy system was poured into 350 ml. of water to precipitate the polymer, which was then washed in a blender with water for four cycles and with ethyl alcohol for one cycle. It was then vacuum-oven dried at 80°C. overnight to give 2.7 g. of polyamide exhibiting a glass transition temperature of 219°C., a metal block stick temperature of 255°C., and an inherent viscosity of 0.12 in concentrated sulfuric acid at 25°C. A bar, compression-molded at 265°C./500 lb./1 min., was shiny and hard, and showed considerable resistance to breaking. It could be ignited in air but did not continue to burn when the flame was removed.

Infrared spectra of this polyamide show —NH, secondary amide and conjugated unsaturation corresponding to the polyamide structure supra.

In another preparation by the above procedure a polyamide was obtained exhibiting a glass transition temperature of 228°C., a gradient bar stick temperature of 293°C., an inherent viscosity of 0.39.

Anal. Calcd. for $C_{10}H_6N_4O_2S$:
C, 48.78; H, 2.44; N, 22.76; S, 13.00.
Found: C, 47.84; H, 2.41; N, 22.35; S, 12.80.
47.52   2.78   22.30

EXAMPLE 10

Preparation of a 1,2,5-thiadiazole/-p-phenylene polyamide

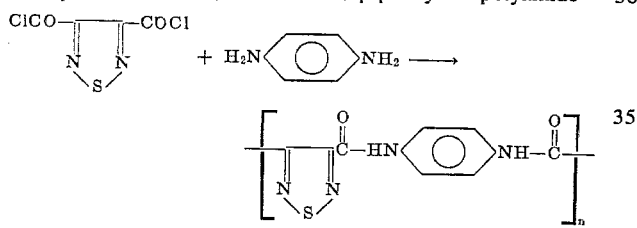

1,2,5-thiadiazole-3,4-dicarbonyl chloride [10.55 g. (0.050 mole)] was added in three portions over a period of 16 minutes to a solution of 5.40 g. (0.050 mole) of p-phenylenediamine in 100 ml. of anhydrous hexamethylphosphoramide being stirred rapidly and cooled with an ice bath. The bath was allowed to warm gradually to room temperature, and stirring was continued until the precipitating polymer stalled the stirrer. After 20 hours the system was treated with water, and the polymer was washed in a blender three times with water and two times with ethyl alcohol. It was then dried at 80°C./1 mm. for 3 days to give 11.0 g. of polyamide that did not stick to a metal block at 400°C., and which had an inherent viscosity of 0.63 in concentrated sulfuric acid at 25°C.

Anal. Calcd. for $C_{10}H_6N_4O_2S$:
C, 48.78; H, 2.44; N, 22.76; S, 13.00.
Found: C, 47.96; H, 2.50; N, 22.20; S, 12.55.
47.70   2.57   22.16

Infrared spectra of this polyamide show NH, carbonyl, and aromatic-type unsaturation corresponding to the polyamide structure above.

EXAMPLE 11

Preparation of a 1,2,5-thiadiazole/-aromatic polyamide

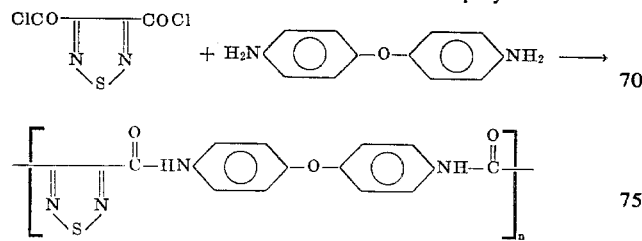

A thiadiazole/aromatic polyamide was prepared in the manner of example 10 by adding 11.550 g. (0.05474 mole) of 1,2,5-thiadiazole-3,4-dicarbonyl chloride at 1°C. to a solution of 10.948 g. (0.05474 mole) of 4,4'-oxydianiline in 100 ml. of purified hexamethylphophoramide. The polyamide obtained (17.2 g.) exhibited a glass transition temperature of 227°C., a gradient bar stick temperature of 350°C., a melt at 375°C. from which flexible filaments could be drawn, and an inherent viscosity of 0.5 in m-cresol at 25°C.

Anal. Calcd. for $C_{16}H_{10}O_3N_4S$:
C, 56.80; H, 2.96; N, 16.57; S, 9.47.
Found: C, 55.42; H, 3.06; N, 16.22; S, 9.21.
55.42   2.84   16.17

Infrared spectra show NH, carbonyl, cyclic conjugated C = C and C = N, and aromatic ether absorption corresponding to the thiadiazole polyamide structure shown in the equation.

A 5 percent dimethylformamide solution of this polymer was spun into water and flexible filaments were obtained. When hot-drawn 4× at 250°C. over a pin the filaments were increased in strength.

EXAMPLE 12

Preparation of a 1,2,5-thiadiazole polyhydrazide and a polydiazole

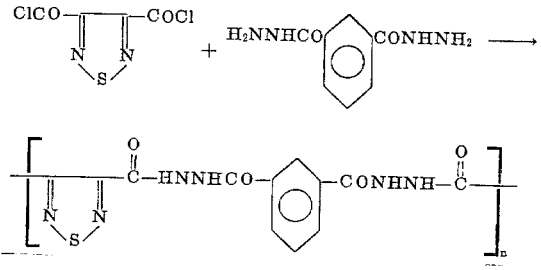

A. To a solution of 10.620 g. (0.05474 mole) of isophthaloyl dihydrazide in 100 ml. of anhydrous hexamethylphosphoramide being stirred and cooled in an ice bath was added in 3 portions over a half-hour period 11.550 g. (0.05474 mole) of 1,2,5-thiadiazole-3,4-dicarbonyl chloride, and the system was stirred overnight. The polymer was precipitated into water, washed in a blender four times with water and once with acetone, and dried at 80°C./5 mm. overnight. The resulting thiadiazole polyhydrazide (15.0 g.) exhibited a glass transition temperature of 198°C., a gradient bar stick temperature of 304°C., a viscous melt at 325°C. from which filaments could be drawn, and an inherent viscosity of 0.16 in m-cresol at 25°C.

Anal. Calcd. for $C_{12}H_8O_4N_6S$:
C, 43.40; H, 2.41; N, 25.30; S, 9.57.
Found: C, 41.14; H, 2.70; N, 23.29; S, 10.14.
41.05   2.38   23.31

Infrared spectra show NH, carbonyl, and conjugated C = C and C = N corresponding to the structure shown above.

B. After-treatment of the polymer of part A.

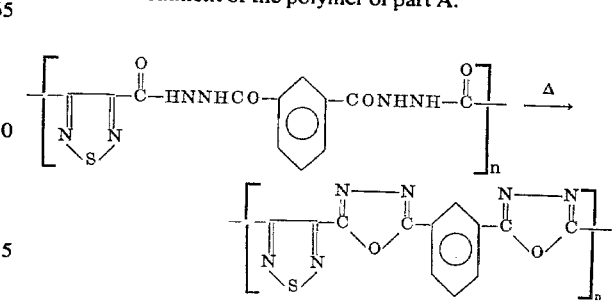

A small sample of the polyhydrazide of A above was heated on a metal bar at 350°C. for 15 minutes to give yellow polymer no longer sticking at 300°C. The infrared spectra of this treated polymer showed new absorption in the ether region and increased unsaturation, corresponding to the oxadiazole structure shown in the equation immediately above.

It should be noted this second product obtained by thermal rearrangement of the first has a E segment in $+A-E+_n$ termed arylenebis-[2-(1,3,4-oxadiazole)-5-yl], which has the formula

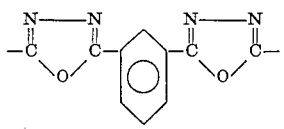

EXAMPLE 13

Preparation of a thiadiazole polyamide by means of a diisocyanate

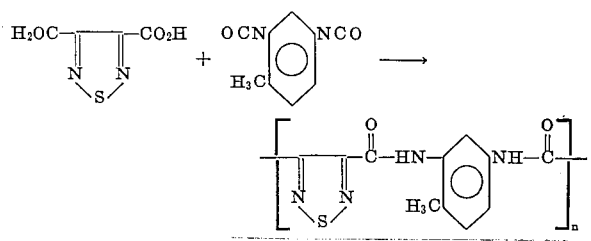

A thiadiazole polyamide was prepared by heating 12.74 g. (0.0732 mole) of toluene-2,4-diisocyanate and 12.74 g. (0.0732 mole) of 1,2,5-thiadiazole-3,4-dicarboxylic acid in 60 ml. of anhydrous N-methylpyrrolidone for 19 hours at 100°C. At this point carbon dioxide evolution had almost ceased, and a 10 ml. sample of the reaction mixture was precipitated by pouring it into methanol. The precipitate was washed and dried to give a thiadiazole polyamide exhibiting an inherent viscosity of 0.14 in m-cresol at 25°C. and infrared absorption corresponding to NH, carbonyl, and conjugated C = C and C = N. The remainder of the reaction mixture was heated further at 150°C. for an hour and at 110°C. for 5 hours. It was then worked up in the same manner as the early sample to give 9 g. of thiadiazole polyamide with a glass transition temperature of 191°–197°C., a gradient bar stick temperature of 250°C., an inherent viscosity of 0.11 in m-cresol at 25°C.

Anal. Calcd. for $C_{11}H_8O_2N_4S$:
    C, 50.80; H, 3.08; N, 21.53.
Found: C, 50.96; H, 3.62; N, 19.86.
    50.64  3.73  19.83

EXAMPLE 14

Preparation of a 1,2,5-thiadiazole poly(amide-urethane)

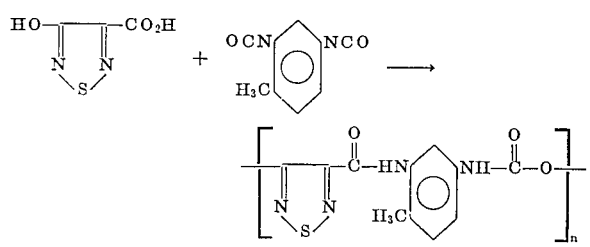

A solution of 4.969 g. (0.0340 mole) of 3-hydroxy-1,2,5-thiadiazole-4-carboxylic acid and 5.915 g. (0.0340 mole) of toluene-2,4-diisocyanate in 45 ml. of N-methylpyrrolidone was heated under nitrogen at 125°C. for 25 hours, at which point carbon dioxide evolution had practically ceased. The dark solution was poured into methanol, and the resulting precipitated was washed on the filter several times with methanol and dried at 80°C./5 mm. overnight to give 3.1 g. of poly(amide-urethane) exhibiting a glass transition temperature of 174°C., a gradient bar stick temperature of 273°C., and an inherent viscosity of 0.15 in m-cresol at 25°C.

Anal. Calcd. for $C_{11}H_8O_3N_4S$:
    C, 47.85; H, 2.90; N, 20.28.
Found:
    C, 52.93; H, 4.20; N, 19.20.
    52.79  4.41  19.04

Infrared spectra show NH, carbonyl, and conjugated unsaturation.

EXAMPLE 15

Preparation of a 1,2,5-thiadiazole polyether

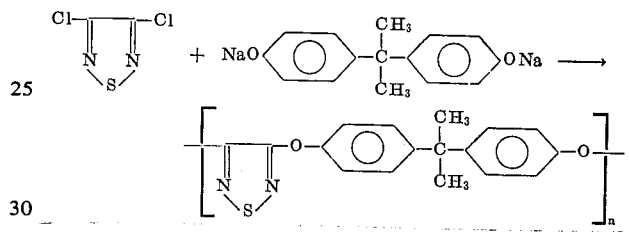

A solution of 3.264 g. (0.021 mole) of 3,4-dichloro-1,2,5-thiadiazole and 5.712 g. (0.021 mole) of the disodium salt of 2,2-bis(4,4'-hydroxyphenyl)propane in 50 ml. of anhydrous 2,4-dimethysulfolane was heated and stirred under nitrogen at 115°C. for 4 hours, at which point a sample of the reaction mixture was poured into methanol. A precipitate of polymer was formed. The polymer was dissolved in chloroform and cast from the solution onto glass to give a tough, transparent, strongly adherent coating. The polymer exhibited a metal block stick temperature of 150°C.

Anal. Calcd. for $C_{17}H_{14}O_2N_2S$:
    C, 65.80; H, 4.51; N, 9.03.
  Found: C, 64.59; H, 4.33; N, 8.48.

Infrared spectra of this polymer show ether, and conjugated cyclic C = C and C = N.

A portion of the original reaction mixture heated an additional 2 hours at 150°C. yielded polymer which exhibited an inherent viscosity of 0.14 in m-cresol at 25°C. and gave a negative copper oxide flame test for chlorine.

EXAMPLE 16

Preparation of a 1,2,5-thiadiazole/-phenylene copolyamide with dimethylpiperazine

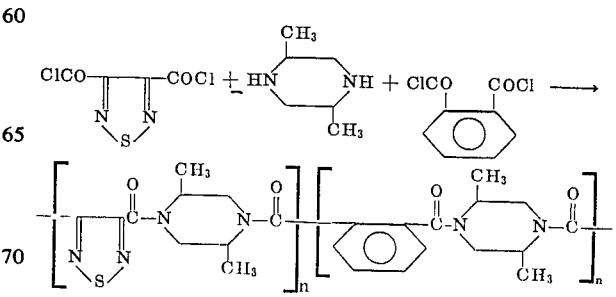

A solution of 7.2 ml. (0.050 mole) of o-phthaloyl chloride and 10.55 g. (0.050 mole) of 1,2,5-thiadiazole-3,4-dicarbonyl chloride in 50 ml. of anhydrous methylene chloride was added rapidly to an ice-cooled, jacketed blender containing 12.92 g. (0.113 mole) of trans-2,5-dimethylpiperazine, 340 ml. of water, 8.00 g. (0.200 moles) of sodium hydroxide and 50 ml. of anhydrous methylene chloride. After 5 minutes of rapid stirring the supernatant liquid was poured from the white coagulate. This was washed in the blender with 500 ml. of acetone and rinsed on a filter with 250 ml. of acetone. This washing schedule was then carried out 5 times with water and a final time with acetone. The snow white, granular copolyamide was dried in a vacuum oven at 80°C./5 mm. overnight. The weight of the polymer was 20.5 g. Its inherent viscosity was 1.68 in m-cresol at 0.1 percent concentration at 25°C., and it softened on a gradient bar at 335°C.

Anal. Calcd. for $C_{14}H_{16}N_2O_2$:
C, 68.88; H, 6.56; N, 11.47.
Calcd. for $C_{10}H_{12}N_4O_2S$:
C, 47.64; H, 4.77; N, 22.22; S, 12.68
Found:
C, 55.45; H, 5.48; N, 16.78; S, 6.48

In the process of this example m- and p-phthaloyl chloride can be used in place of or in combination with o-phthaloyl chloride. By nitrogen and sulfur analysis this polymer corresponds to a 1:1 thiadiazole/phenylene copolyamide with dimethylpiperazine as indicated in the equation above.

A clear, colorless, viscous solution of the copolymer was prepared by slowly rotating 0.5 g. of polymer in 3 ml. of chloroform from which flexible, strong fibers could be readily dry spun. A film cast from this solution was tough and clear.

I claim:

1. A fiber and film forming polymeric 1,2,5-thiadiazole consisting essentially of recurring units of the formula

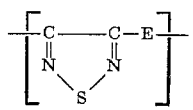

where E is at least one divalent radical selected from the group:

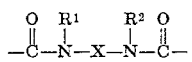

wherein $R^1$ and $R^2$ are hydrogen or lower alkyl and X is:
polymethylene of the formula $-(CH_2)_n-$ where $n$ is an integer of 0–20, with the proviso that $R^1$ and $R^2$ may also be aryl when X is polymethylene,
phenylene of the formula

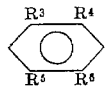

wherein $R^3$, $R^4$, $R^5$ and $R^6$ are hydrogen, alkyl, aryl, alkoxy, halogen, nitro or nitrile and the two remaining bonds each attached to a nitrogen in the polymer chain are ortho, meta or para to each other, with the proviso that $R^1$ and $R^2$ are hydrogen only when X is phenylene,
cyclohexylene of the formula

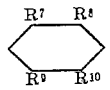

wherein the ring is saturated, the R's are hydrogen, alkyl, cycloalkyl, alkoxy or halogen and the two remaining bonds each attached to a nitrogen in the polymer chain are ortho, meta or para to each other,
aromatic group of the formula

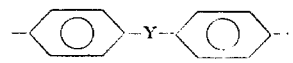

wherein Y is oxygen, sulfur, alkylene of one to 12 carbons, alkylidene, including polyhaloalkylidene, of two to 13 carbons and phenylene, and the rings may be substituted with halogen, and
group corresponding to the above aromatic group wherein one or both of the depicted aromatic rings is fully hydrogenated;

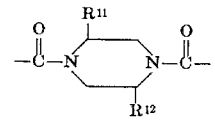

wherein $R^{11}$ and $R^{12}$ are hydrogen or lower alkyl;

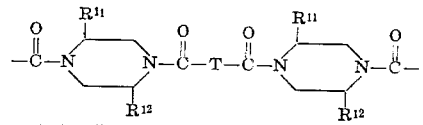

wherein T is o, m, or p phenylene and $R^{11}$ and $R^{12}$ are as defined above; and

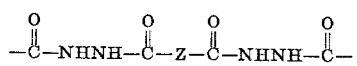

wherein Z is arylene of six carbon atoms or $(CH_2)_n$ where $n$ is an integer of 1 to 20.

2. The polymer of claim 1 wherein E of the recurring unit has the formula

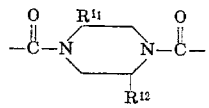

3. The polymer of claim 2 wherein E of the recurring unit has the formula

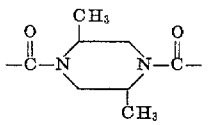

4. The polymer of claim 1 wherein E of the recurring unit has the formula

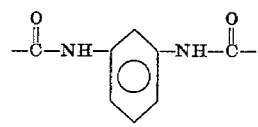

5. The polymer of claim 1 wherein E of the recurring unit has the formula

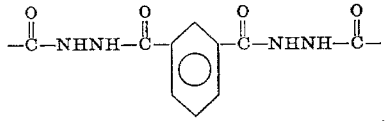

6. The polymer of claim 1 wherein E of the recurring unit has the formula
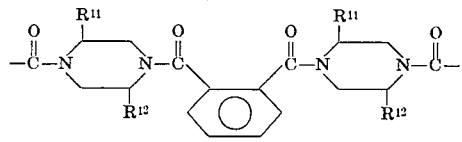
7. The polymer of claim 1 in the form of a self-supporting film.
8. The polymer of claim 1 in the form of a fiber.
* * * * *